United States Patent
Sato

(10) Patent No.: US 7,597,990 B2
(45) Date of Patent: Oct. 6, 2009

(54) FUEL CELL AND FUEL CELL SYSTEM

(75) Inventor: Yuusuke Sato, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 315 days.

(21) Appl. No.: 11/530,695

(22) Filed: Sep. 11, 2006

(65) Prior Publication Data

US 2007/0072051 A1 Mar. 29, 2007

(30) Foreign Application Priority Data

Sep. 29, 2005 (JP) ............... 2005-285544

(51) Int. Cl.
*H01M 8/02* (2006.01)

(52) U.S. Cl. .......................... 429/38; 429/30

(58) Field of Classification Search ................ 429/12, 429/13, 22, 34, 36, 30, 38
See application file for complete search history.

(56) References Cited

U.S. PATENT DOCUMENTS

| | | | |
|---|---|---|---|
| 2003/0124414 A1* | 7/2003 | Hertel et al. | 429/44 |
| 2004/0197620 A1* | 10/2004 | Arthur | 429/22 |
| 2005/0026027 A1 | 2/2005 | Sato | |
| 2005/0171659 A1 | 8/2005 | Okazaki | |
| 2006/0127719 A1* | 6/2006 | Brantley et al. | 429/20 |

FOREIGN PATENT DOCUMENTS

JP 2003-157879 5/2003

OTHER PUBLICATIONS

U.S. Appl. No. 12/342,268, filed Dec. 23, 2008, Yagi, et al.
U.S. Appl. No. 12/207,662, filed Sep. 10, 2008, Sato, et al.

* cited by examiner

*Primary Examiner*—Patrick Ryan
*Assistant Examiner*—Monique Wills
(74) *Attorney, Agent, or Firm*—Oblon, Spivak, McClelland, Maier & Neustadt, L.L.P.

(57) ABSTRACT

Provided is a fuel cell including a container having at least two openings, a power generating unit contained in the container, the power generating unit having a membrane electrode assembly, an anode and a cathode channel plates, and a fan to supply oxygen into the membrane electrode assembly from one of the openings of the container. The cathode channel plate has a clearance against the container, and the cathode channel plate has the openings communicating with a space formed between the fan and the membrane electrode assembly on the face different from the opposite face, and the clearance.

14 Claims, 10 Drawing Sheets

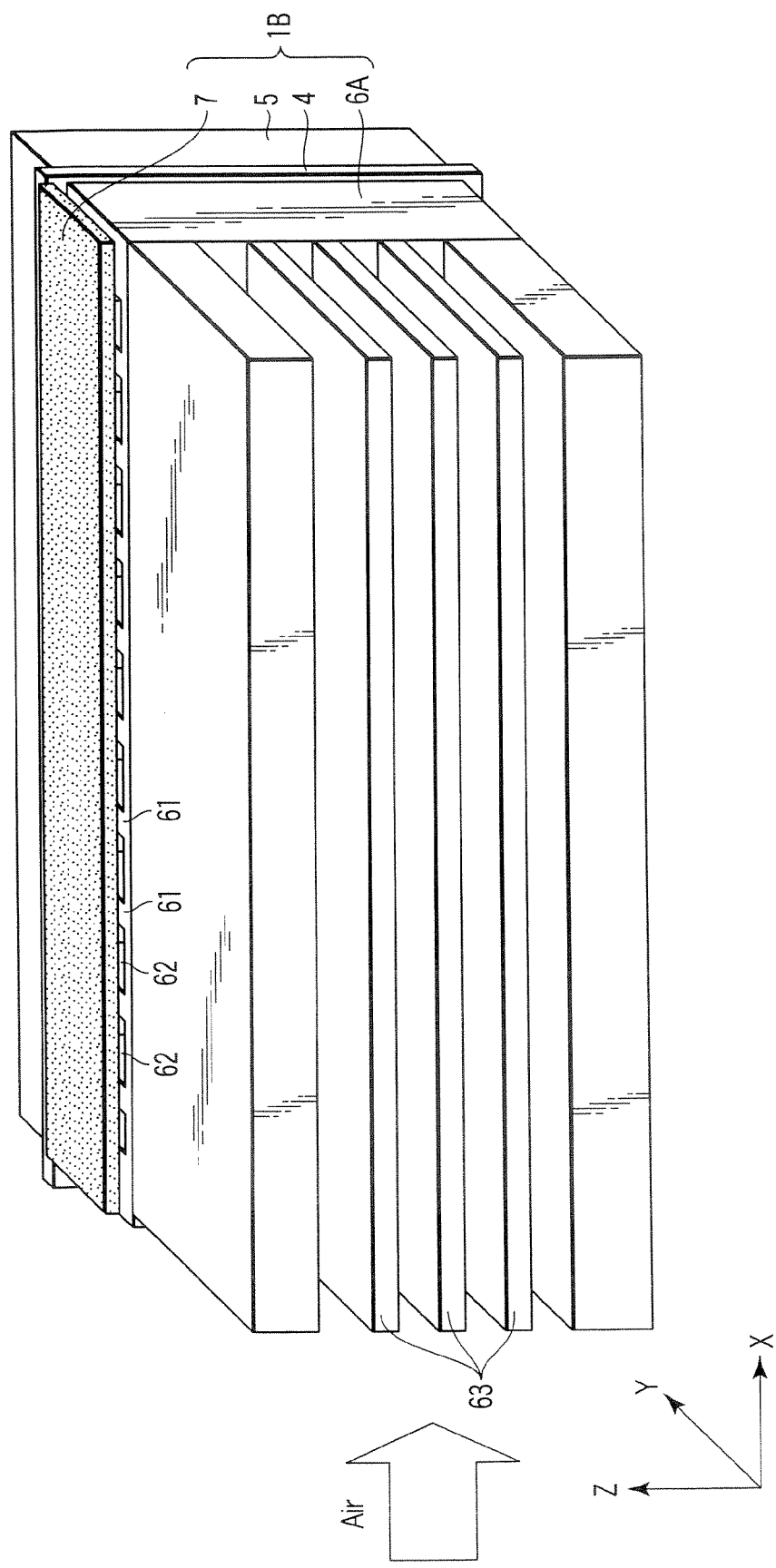
F I G. 5

FUEL CELL AND FUEL CELL SYSTEM

CROSS-REFERENCE TO RELATED APPLICATIONS

This application is based upon and claims the benefit of priority from prior Japanese Patent Application No. 2005-285544, filed Sep. 29, 2005, the entire contents of which are incorporated herein by reference.

BACKGROUND OF THE INVENTION

1. Field of the Invention

The invention relates to a fuel cell and a fuel cell system.

2. Description of the Related Art

Recently, an expectation is mounting highly for a fuel cell as a clean energy not emitting any harmful matter such as sulfur oxide and nitrogen oxide, and various small power supply systems have been proposed for use in an automobile, a household power source, and a portable information appliance. In particular, a direct methanol fuel cell (DMFC) consumes pure methanol or a mixed solution of methanol and water. For this reason, as compared with other types of fuel cells using hydrogen as a fuel, not only handling of a fuel is easier, but also no humidifying mechanism is needed and the operating temperature is low, and thus, a heat control mechanism may be simple. These merits mean that the DMFC is suited as a power source for small appliances. Against such a background, development of the DMFC as a small-sized power supply is being promoted.

For the purpose of supplying an oxidizer to the cathode side and cooling a membrane electrode assembly (MEA), the DMFC is provided with ventilation means, such as a fan, for blowing wind to the cathode side. If ventilation to the cathode side is excessive, however, the MEA is too dried, so that a power generation performance of the MEA deteriorates.

Accordingly, JPA 2003-157879 (KOKAI) incorporated by reference, the entire contents of which are incorporated herein by reference, proposes a fuel cell in which, in order to prevent a cathode gas diffusion catalyst layer of an MEA from being covered with reaction production water at the cathode side, a moisture absorbing evaporation member is externally attached to the cathode side, and wind is blown to the external evaporation member from a fan such that wind does not directly hit the MEA, whereby moisture adhered to the evaporation member is evaporated. In the fuel cell of JPA 2003-157879 (KOKAI), however, the device size is increased since the evaporation member is externally attached to the cathode side, and thus, it is not suited to a small-sized power supply for a portable electronic appliance.

BRIEF SUMMARY OF THE INVENTION

According to an aspect of the present invention, there is provided a fuel cell comprising: a container having at least two openings; a power generating unit contained in the container, the power generating unit having a membrane electrode assembly, an anode channel plate and a cathode channel plate; and a fan to supply oxygen into the membrane electrode assembly from one of the openings of the container, wherein the cathode channel plate has a clearance against the container, and the openings communicate with a space formed between the fan and the membrane electrode assembly on the face different from the opposite face, and the clearance.

According to another aspect of the present invention, there is provided a fuel cell system comprising: a container having at least two openings; a power generating unit contained in the container, the power generating unit having a membrane electrode assembly, an anode channel plate and a cathode channel plate; a fan to supply oxygen into the membrane electrode assembly from one of the openings of the container; a fuel cartridge which stores a fuel; fuel supply means for supplying the fuel to the power generating unit from the fuel cartridge; and a circulation line which circulates the fuel in the power generating unit, wherein the cathode channel plate has a clearance against the container, and the openings communicate with a space formed between the fan and the membrane electrode assembly on the face different from the opposite face, and the clearance.

BRIEF DESCRIPTION OF THE SEVERAL VIEWS OF THE DRAWING

FIG. 5 is a perspective view schematically showing a cathode channel plate according to a modified embodiment;

DETAILED DESCRIPTION OF THE INVENTION

In the case of a DMFC, power generation efficiency is about 20 to 30%, and the temperature of an MEA rises to about 50 to 70° C. during power generation. It has been evident from theoretical calculation that the air quantity necessary for diffusing heat generated in the MEA by an air cooling system is about 60 to 100 times the air quantity required in a cathode reaction. Accordingly, if attempted to suppress temperature rise of the MEA by the air cooling system only, the wind blown to the MEA is too strong, and a proton conductive polymer film and a cathode catalyst layer are dried too much, so that the reaction in the following formulas (2) and (3) is not promoted smoothly. Thus, in an embodiment of the present invention, it is attempted to solve the problems, not through the air cooling system, but by employing a cathode structure obtained by combining a porous cathode channel plate and a stagnant space as described below.

In the embodiment, a porous body is arranged in at least part of a cathode space, and the surrounding is closed, or if one end or both ends of the cathode space is/are opened, a cathode channel is formed in a direction orthogonal to the supply air flow direction. Therefore, even if air necessary for releasing heat is supplied, a stagnant space not forming a forced flow of air is formed in the cathode space. Since, in such a "stagnant space", the air flow stays still and air motion is slow, almost no wind or only a feeble wind is blown to the MEA.

The oxygen consumed in reaction of the following formula (3) is supplied through the porous body by a flow of a volume change portion and diffusion by a concentration difference. Accordingly, the proton conductive polymer film and cathode catalyst layer are hardly dried. Further, the cathode channel plate is a porous body, water produced from the cathode side reaction is absorbed by the plate, and the absorbed water is evaporated by fan draft. Therefore, not only the fuel utility efficiency is enhanced, but also the temperature of the heated MEA can be lowered effectively and the performance of the MEA can be extracted to a maximum extent. Besides, since air of a larger flow rate as compared with the amount of oxygen consumed in cathode reaction is supplied by fan draft, a concentration distribution of oxygen in the cathode is very small, and there is no drop of the oxygen concentration at the downstream side as experienced in the conventional MEA. From this point of view as well, the performance of the MEA can be enhanced.

Figure 6:
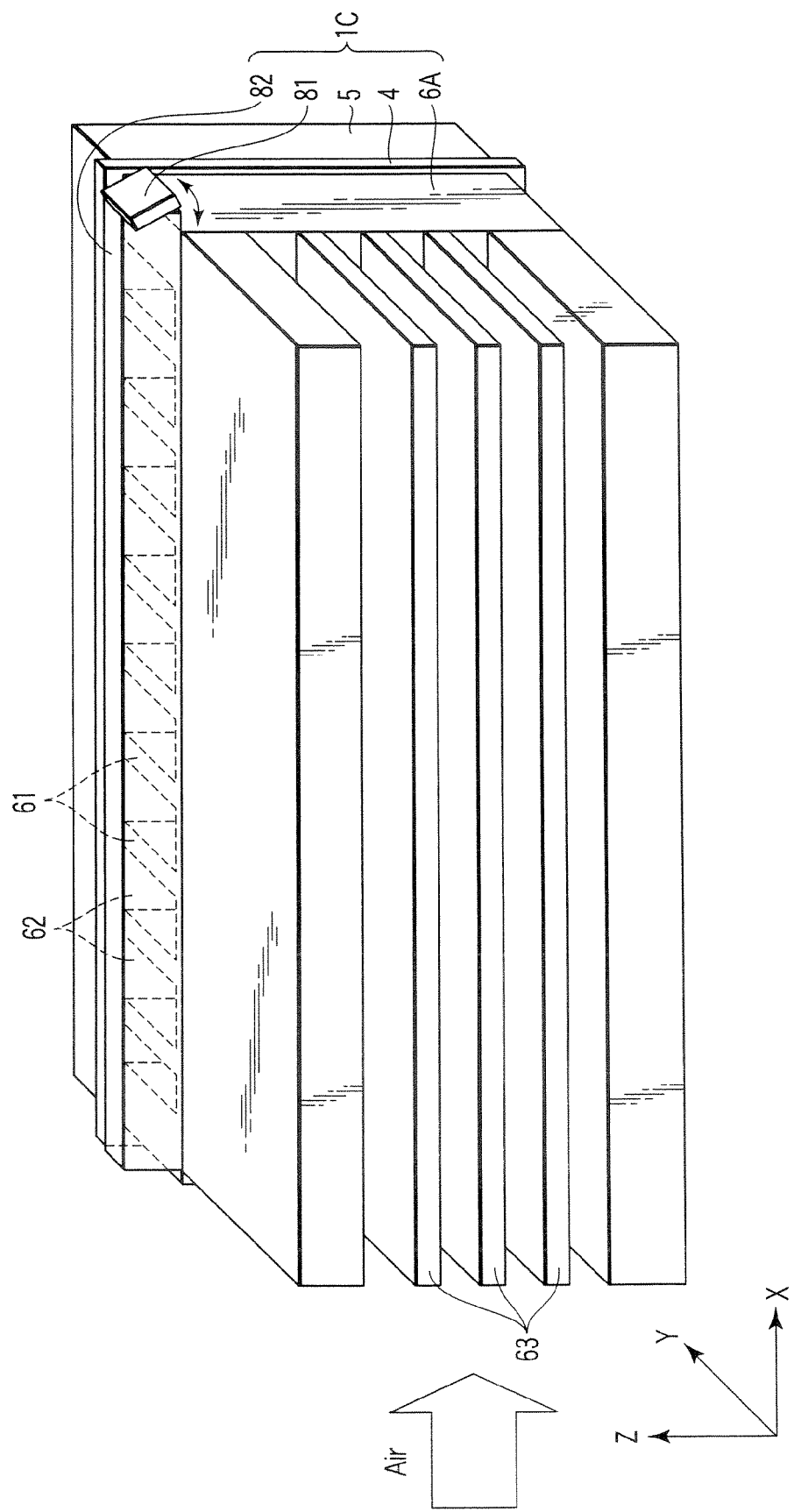
FIG. 6 is a perspective view schematically showing a cathode channel plate according to a modified embodiment.

When the cathode space is opened at one end or both ends, the cathode space can be formed in a direction substantially orthogonal to the flow direction of fan draft air. In this case, a porous membrane 7 may be provided at one or both opened ends of the cathode space (FIG. 5), or a manifold 82 may be provided at one end of the opening (FIG. 6). To avoid a forced flow in the cathode channel, it is effective to block one end or both ends of the cathode channel by the porous membrane 7. In the case of the manifold 82, an on-off valve 81 is provided at a terminal end of the manifold 82, and the air flow rate supplied in the cathode space is adjusted. By adjusting the opening degree of the valve 81, the air intake flow rate can be adjusted, and part of the supply air can be introduced into the cathode channel.

Figure 10A:
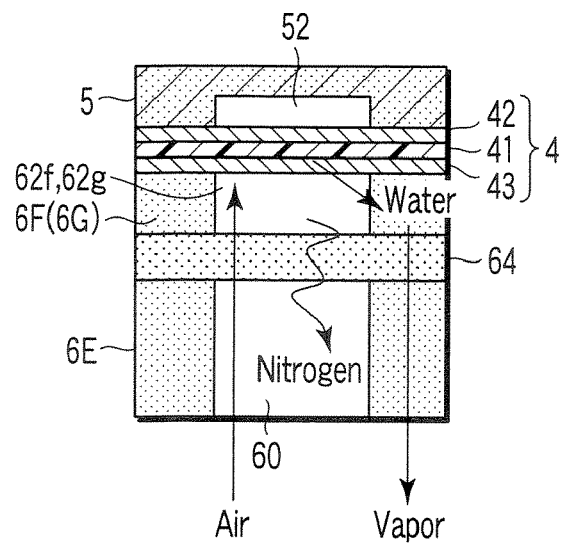
FIGS. 10A, 10B, 10C and 10D each are sectional views schematically showing a fuel cell according to a different embodiment having a cathode channel plate forming various stagnant spaces.
Figure 10B:
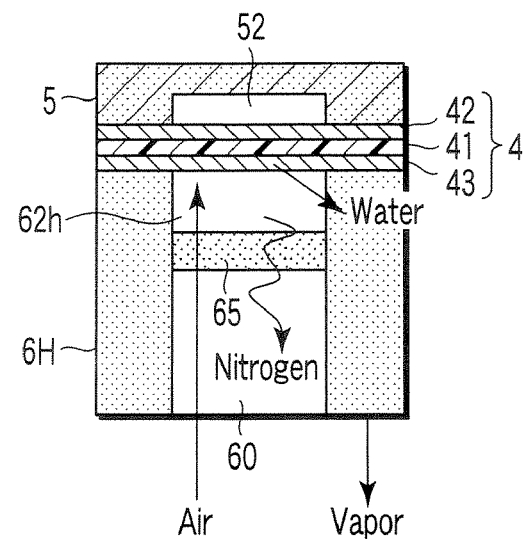

Alternatively, a part 65 of the porous body forming the closed cathode space may be made hydrophobic, and the other part 68 may be hydrophilic (see FIG. 10B). When a portion through which air passes is defined as the hydrophobic porous body 65, and the other surrounding portion is defined as the hydrophilic porous body 68, water hardly invades into the porous body 65 crossing an air permeation channel, and smooth flow of air in the cathode space and diffusion of nitrogen can be maintained.

Figure 10C:
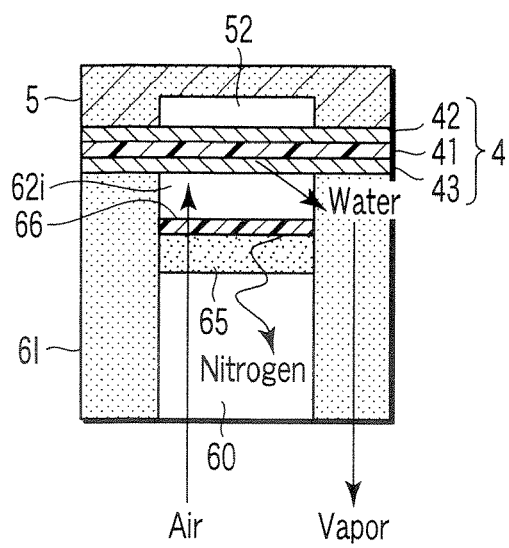

In addition, by providing an adsorbent 66 at least in part of the cathode channel, traces of hydrocarbon gas having adverse effects on power generation can be absorbed solely from the air necessary for cathode reaction, and the amount of the absorbent 66 can be minimized (see FIG. 10C). Components of trace gas such as hydrocarbon existing in the air deteriorate the cathode catalyst. If a large volume of air is made to contact with the adsorbent, the life of the adsorbent is shortened. Accordingly, solely the air necessary for reaction can be brought into contact with the adsorbent by providing the adsorbent in the cathode channel, and as a result, the life of the adsorbent can be extended.

Figure 10D:
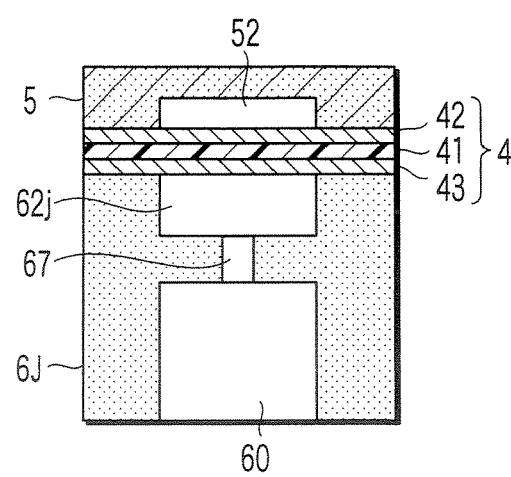

Also by opening a small pore 67 for supplying air in the closed cathode space, a cathode space 62j can be kept in a stagnant state (see FIG. 10D). This is because the pore 67 is opened in a direction (Y-direction) orthogonal to the direction (X-direction) of fan supply air flow.

To absorb moisture, the porous body is preferred to be hydrophilic. When the cathode space is formed of a porous body, use of a hydrophilic porous body (for example, a carbon porous body) makes it possible to absorb the water produced by cathode reaction and to evaporate the water at the supply intake side.

Figure 4:
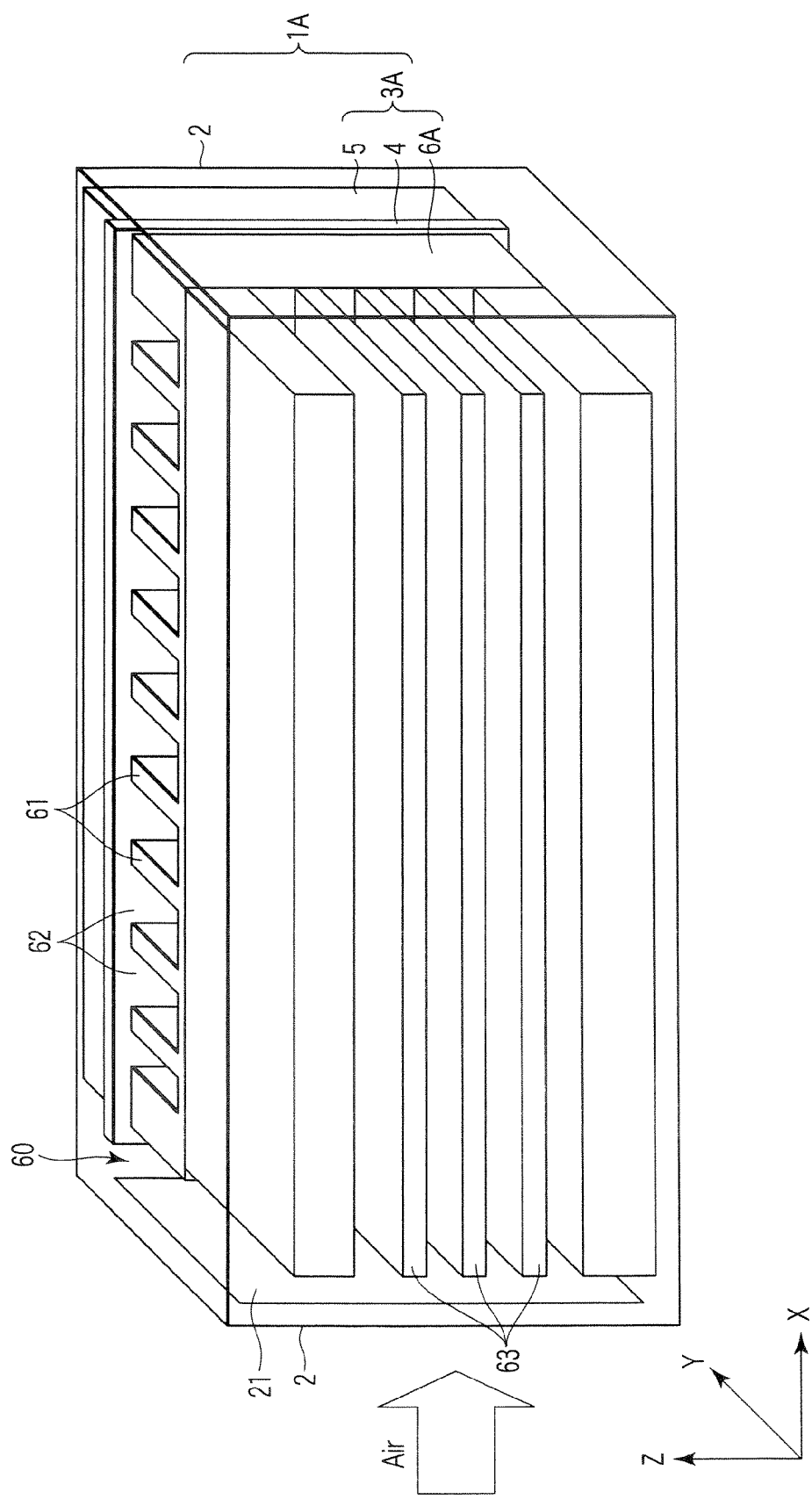
FIG. 4 is a perspective view schematically showing a cathode channel plate according to a modified embodiment.

By installing a fin at the side of the cathode channel opposite to the MEA, a necessary cooling area can be assured (FIGS. 4, 5 and 6). Since the hydrophilic porous body dries the supply air at the fin side more efficiently even if the pore size is the same at the cathode channel and at the fin side, water moves from the cathode channel to the fin side. In the case of the hydrophilic porous body, the smaller the pore size, the greater the capillary force. For this reason, the pore size of the porous body of the cathode channel is set larger than the pores size at the fin side, whereby water is moved to the fin side more effectively by the capillary force. Therefore, it is desired to set the pore size of the porous body smaller as going away from the MEA. As the fuel to be supplied to the anode, for example, gas containing hydrogen, or a liquid containing methanol may be used.

When the quantity f of air supplied is given by the following formula (1), it is possible to release heat by the balance of heat obtained by subtracting the water evaporation latent heat from the heat generated in the MEA, so that the temperature of the MEA can be kept at a predetermined temperature. A controller always monitors the temperature of the MEA so as to control the supply air flow rate "f" such that the temperature of the MEA is set to a predetermined temperature:

$$f = \frac{\Delta H_{fuel}(1-\eta)q_{fuel} - \Delta Q_{vap}}{C_p \rho (T_{out} - T_{in})} \quad (1)$$

where $\Delta H_{fuel}$ denotes a combustion heat of a fuel; $\eta$ denotes a power generation efficiency; $q_{fuel}$ denotes a flow rate of a fuel for use in power generation; $\Delta Q_{vap}$ denotes water evaporation latent heat in the cathode; $C_p$ denotes low pressure specific heat of air; $\rho$ denotes an air density; $T_{in}$ denotes an inlet air temperature; and $T_{out}$ denotes an outlet air temperature.

By such a control, an air supply pump to the cathode is not needed. Even if an air supply pump is needed, the power consumption can be reduced. Further, while humidifying the cathode, necessary oxygen can be supplied.

Moreover, it is possible to release heat efficiently from the cell, and the cooling area is smaller, so that the fuel cell can be reduced in size. Heat by loss of power generation is released because a temperature difference between the cell temperature and the cooling air temperature reaches a maximum temperature difference. These effects are particularly enhanced in the fuel cell having a relatively low temperature of an electromotive force unit, and using proton conductive polymer film requiring moisture insulation.

Referring to basic formulas of power generation reactions and basic formulas expressing a difference in capillary force between a hydrophilic material and a hydrophobic material, an outline of movement of water at the cathode side will be explained below.

At the anode side, reaction of the following formula (2) is promoted.

$$CH_3OH + H_2O \rightarrow CO_2 + 6H^+ + 6e^- \quad (2)$$

At the cathode side, reaction of the following formula (3) is promoted.

$$3/2 O_2 6H^+ + 6e^- \rightarrow 3H_2O \quad (3)$$

Assuming that a liquid of volume V1 occupies a space of volume V in the porous body, a liquid saturation degree s is defined by the following formula (4).

$$s = V_l/V \tag{4}$$

When the porous body is hydrophilic, the capillary force Pc in the porous body is given by the following formula (5):

$$p_c = \sigma \cos\theta_c \left(\frac{\varepsilon}{K}\right)^{1/2} [1.417(1-s) - 2.120(1-s)^2 + 1.263(1-s)^3] \tag{5}$$

When the porous body is hydrophobic, on the other hand, the capillary force Pc in the porous body is given by the following formula (6):

$$p_c = \sigma \cos\theta_c \left(\frac{\varepsilon}{K}\right)^{1/2} [1.417s - 2.120s^2 + 1.263s^3] \tag{6}$$

where σ denotes a surface tension of the liquid; θc denotes a liquid contact angle; and r denotes a radius of the porous body.

In the given conditions of the surface tension of the liquid σ, the contact angle θc, and the radius of the porous body r, the static water pressure created by the capillary force Pc can be expressed as a function of the liquid saturation degree s. In the hydrophilic porous body, the static water pressure is the same as or lower than the atmospheric pressure. In the hydrophobic porous body, by contrast, the static water pressure is the same as or higher than the atmospheric pressure. In the case where a hydrophobic portion and a hydrophilic portion coexist, the water in the liquid is more likely to be present in the hydrophilic portion.

As shown in formula (5), the smaller the pore radius r of the porous body, the greater the capillary force Pc becomes. Hence, even in the hydrophilic portion, the water in the liquid moves more smoothly from the larger pore to the smaller pore.

By forming the cathode channel substantially orthogonal to the flow of supply air, the cathode channel forms a stagnant state for supply air. Air of a volume difference portion between oxygen consumed in cathode reaction and steam generated by the reaction flows in or flows out of the cathode channel end face. When the cathode channel is formed of a porous body, generated water is absorbed by the porous body by the capillary force, and hence the volume tends to decrease.

Only the oxygen in the air is consumed by the reaction, so that the nitrogen concentration is elevated, but the nitrogen is diffused and moves to the supply air side through the cathode end face or the porous body. Since a forced flow is not generated in the cathode channel, the steam pressure is substantially close to the satursated steam pressure produced by the water generated by the cathode reaction. Consequently, the cathode catalyst layer or proton conductive polymer film is prevented from being dried, and deterioration of the power generation characteristic of the MEA can be avoided.

The best mode for carrying out the invention will be described below with reference to the accompanying drawings.

Figure 1:
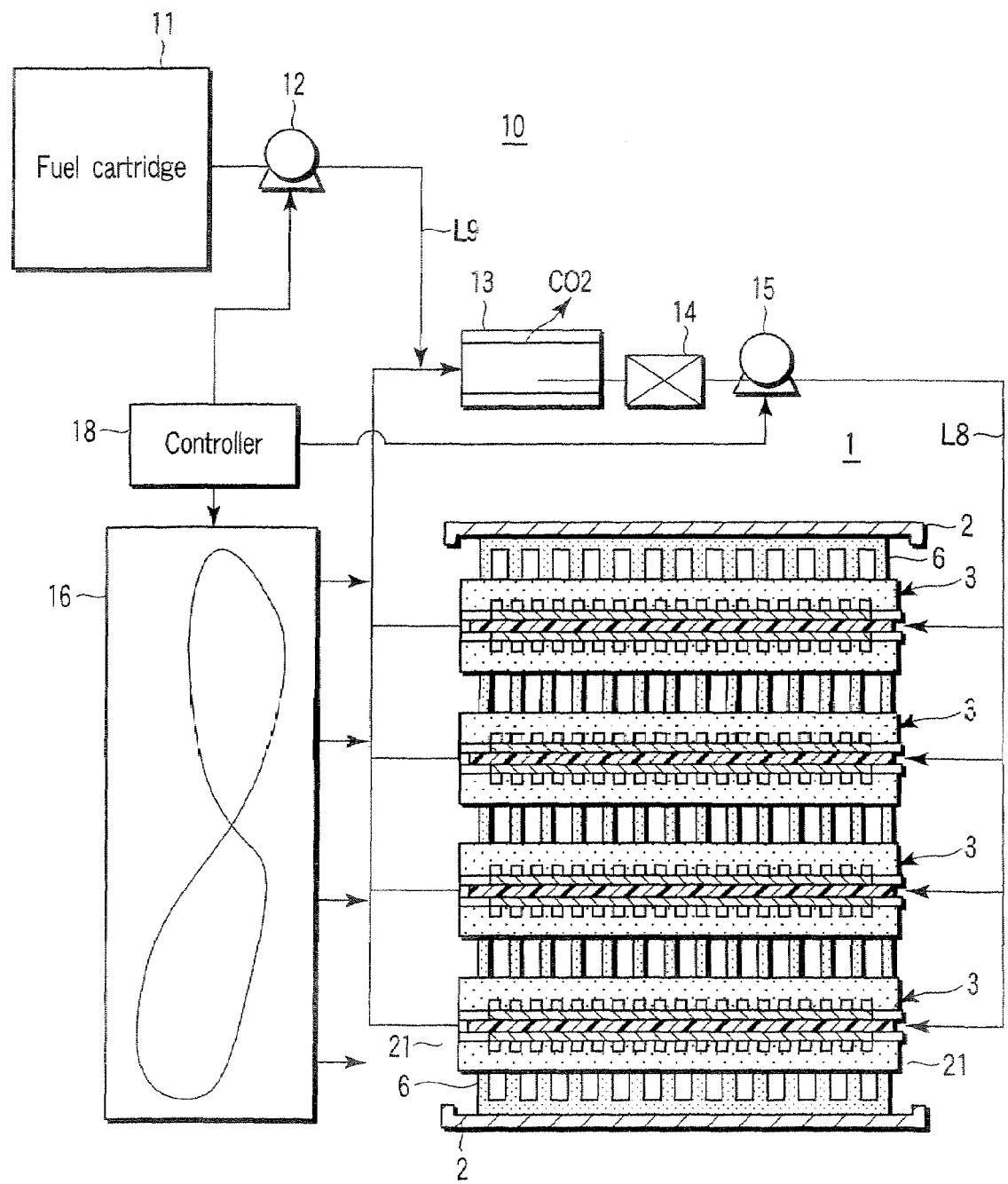
FIG. 1 is a block diagram schematically showing a fuel cell system of the invention.

A fuel cell system 10 of the embodiment comprises, as shown in FIG. 1, a fuel cell 1, a fuel cartridge 11, a fuel pump 12, a gas-liquid separator 13, a filter 14, a circulating pump 15, a draft fan 16, and a controller 18. The fuel cell 1 has a cell stack having a plurality of power generating units 3 stacked in multiple layers. To the anode side of the fuel cell 1, a circulation line L8 including the gas-liquid separator 13, the filter 14, and the circulating pump 15 is connected. Air is supplied from the draft fan 16 to the cathode side of the fuel cell 1.

To the return side of the circulation line L8, that is, at the upstream side of the gas-liquid separator 13, a fuel refill line L9 is connected. The fuel cartridge 11 and the fuel pump 12 are connected to the fuel refill line L9. Through the line L9, an appropriate amount of a high concentration methanol solution or pure methanol liquid is refilled into the circulation line L8. Note that the fuel cartridge 11 is detachably mounted to the upstream line of the pump 12 so as to be exchanged.

The entire fuel cell system 10 is controlled comprehensively by the controller 18. More specifically, the controller 18 possesses various process data, and controls the operation amount of the fuel pump 12, the circulating pump 15 and the draft fan 16 on the basis of various detection signals (for example, a power generation output detection signal, a cell temperature detection signal, etc.) sent from a plurality of sensors (not shown), and process data.

Figure 2:
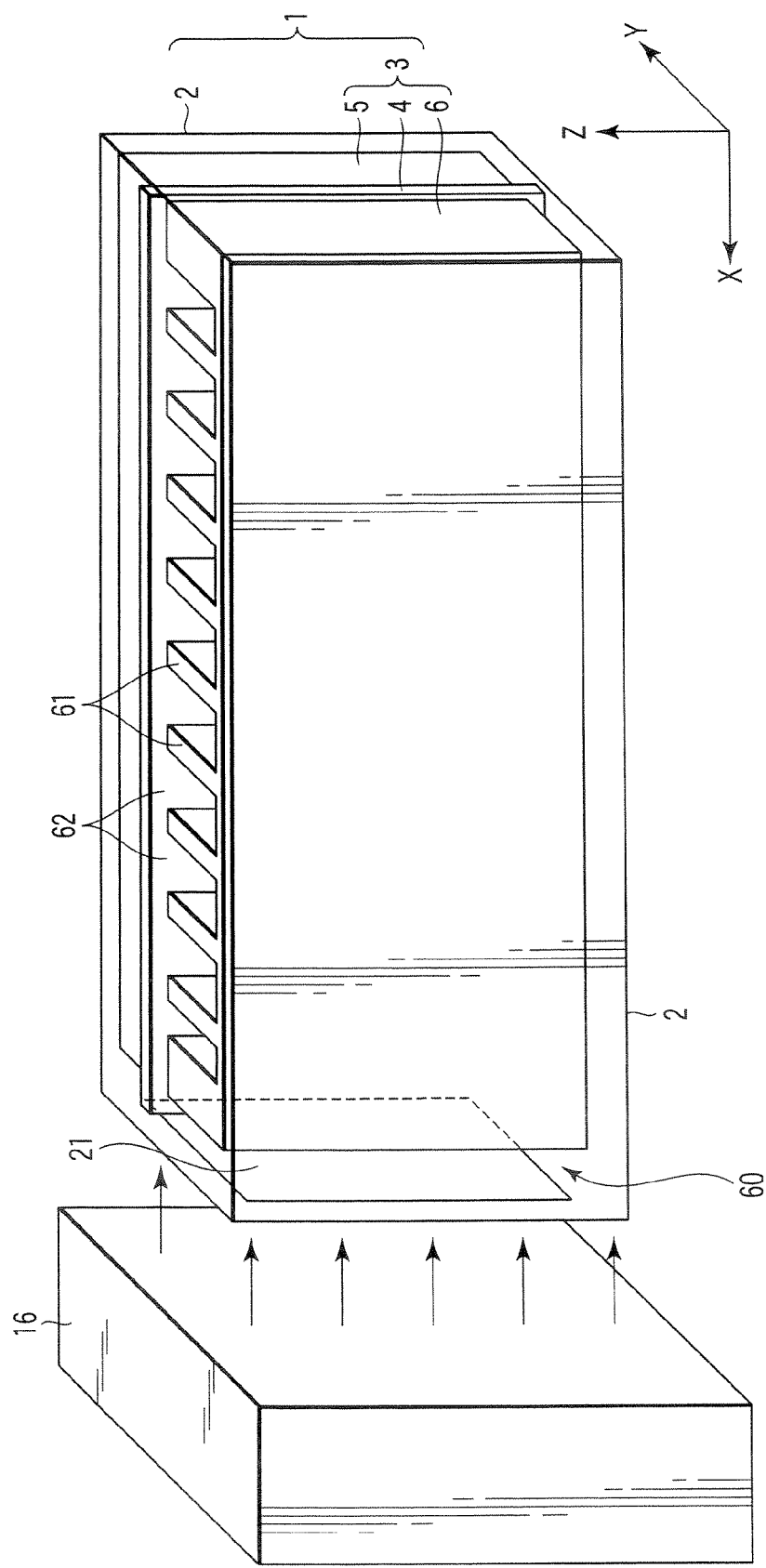
FIG. 2 is a perspective view schematically showing a fuel cell according to the embodiment.

As shown in FIG. 2, an MEA 4 is inserted between an anode channel plate 5 made of dense carbon and a cathode channel plate 6 made of hydrophilic porous carbon, and a cell 3 as a power generating unit is configured. The cell 3 is contained in the container 2, and a predetermined clearance 60 is formed between the container 2 and the cathode channel plate 6. Accordingly, the clearance 60 is made thin in the X-direction.

The container 2 has openings 21 at both ends thereof in the X-direction. Toward the openings 21, a predetermined flow rate of air is supplied from the fan 16, and air is introduced to the cathode channel plate 6 through the clearance 60. FIG. 2 shows only one opening 21 near the fan 16, and does not show the other opening remote from the fan 16.

Figure 3A:
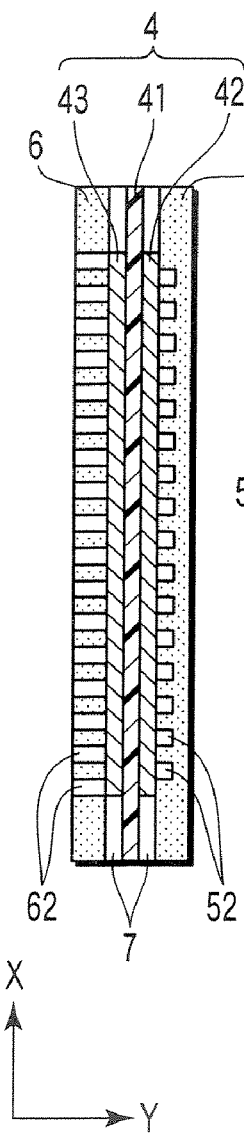
FIG. 3A is a sectional view of essential portions of the fuel cell.

In the cathode channel plate 6, a cathode channel 62 is formed by dividing the cathode space communicating with the clearance 60 by a plurality of channel walls 61 (porous bodies), and is extended in a direction different from the air flow direction (X-direction) from the fan 16, preferably in a direction (Z-direction) substantially orthogonal to the air flow direction. The direction of the cathode channel 62 is different from the fan draft direction (X-direction), that is, the clearance 60 communicating with the cathode channel 62 is formed in the different side (XY side) from the side (YZ side) opposite to the fan 16. Consequently, the wind to the MEA 4 is weak, and evaporation of water from the proton conductive film 41 and the cathode catalyst layer 43 shown in FIG. 3A is suppressed, and excessive drying can be avoided.

In the embodiment, hydrophilic porous carbon (porosity 60%, average pore size 3 pm) is used as the material for the cathode channel plate 6, but the invention is not limited to this material, and other types of hydrophilic porous carbon having different porosity and average pore size may be used. Or, other hydrophilic materials such as sintered metal may be used.

Figure 3B:
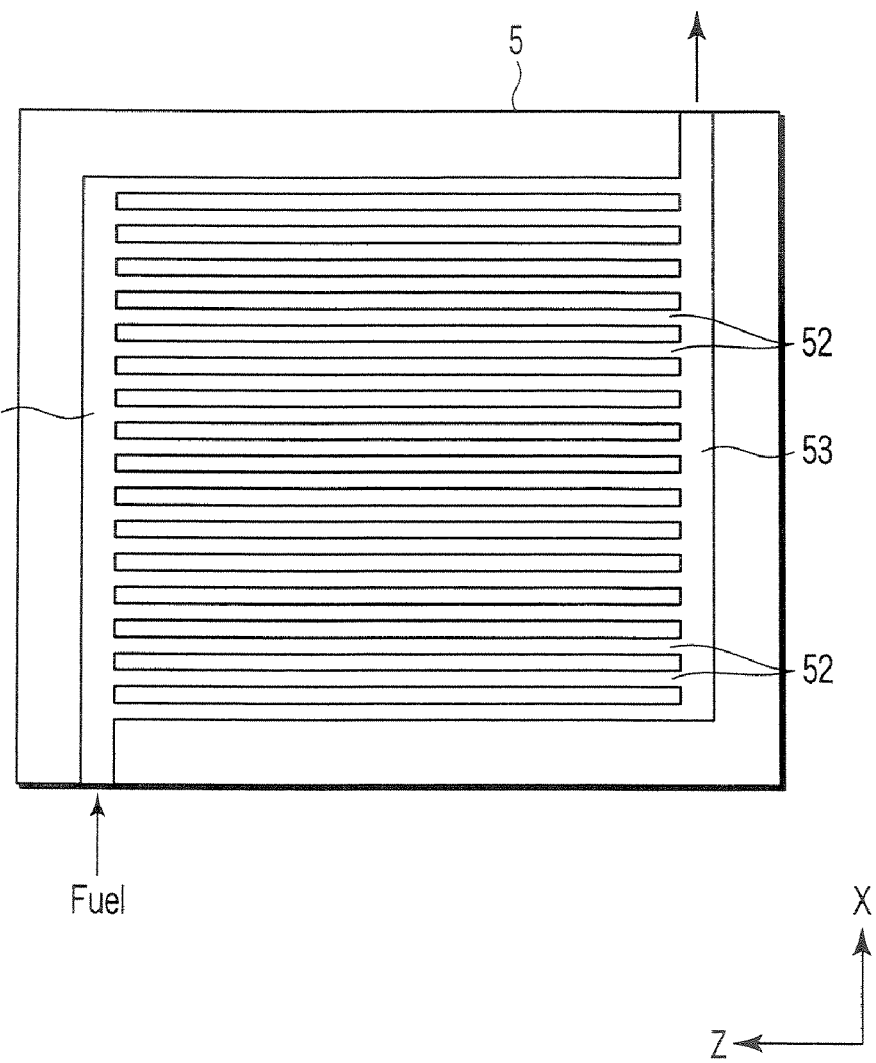
FIG. 3B is a plan view of an anode channel plate.

The anode channel plate 5 includes, as shown in FIG. 3B, an inlet channel 51, a parallel channel 52, and an outlet channel 53. A liquid fuel (methanol solution) flows into the inlet channel 51, passes through a plurality of parallel channels 52, and is gathered and discharged into the outlet channel 53. By passing air into the cathode channel 62 of the cathode channel plate 6, methanol and water are supplied into the proton conductive polymer film 41 by way of the anode catalyst layer 42 of the MEA 4, and air is supplied into the proton conductive polymer film 41 by way of the cathode catalyst layer 43 of the MEA 4. Reference numeral 7 is a sealing member, and the surrounding of the anode catalyst layer 42 and cathode catalyst layer 43 is sealed by the sealing member 7.

When the fuel is supplied into the anode channel plate 5 by the circulating pump 15, and air is supplied into the cathode channel plate 6 by the draft fan 16, the reaction is promoted according to the formulas (2) and (3) to generate power, and the generated power is taken out to the load side by way of a circuit (not shown). At this time, the water produced at the cathode side by reaction of the formula (3) is absorbed by the cathode channel plate 6 (porous body) made of hydrophilic porous carbon. The water absorbed by the cathode channel plate 6 is moved in the porous body toward the side opposite to the MEA 4 and reaches the surface, and then contacts the fan draft air to be evaporated.

In this way, the water produced at the cathode side is evaporated indirectly by way of the porous body 6. Therefore, excessive evaporation of water from the proton conductive film 41 and cathode catalyst layer 43 shown in FIG. 3A can be suppressed, and they are not dried excessively, so that an appropriate amount of moisture is maintained. As a result, the reaction of the formula (2) is promoted, and the fuel utility efficiency is enhanced. In addition, since heat of vaporization is deprived by evaporation of water at the cathode side, it is effective to lower the elevated temperature of the MEA 4. Consequently, the heat releasing effect is further enhanced.

In the case of the DMFC for supplying methanol and water to the anode as a fuel, the power generation efficiency is about 20 to 30%, and the temperature of the MEA 4 reaches as high as about 50 to 70° C. The quantity of air necessary for releasing the heat generated in the MEA by the air cooling system is as much as 60 to 100 times the quantity of air necessary for cathode reaction.

In this embodiment, the cathode space is a closed space formed by enclosing the surrounding by the porous body, or when an end of the cathode space is opened, the cathode channel 62 is formed in a direction different from the supply air direction. Therefore, even if air necessary for releasing of heat is supplied, a forced flow is not formed in the cathode space (or cathode channel 62), or a so-called stagnant space hardly forming such a forced flow is formed. In such a "stagnant space", there is no air stream and the air motion is slow, and thus, there is almost no wind blowing to the MEA 4. For this reason, the proton conductive film 41 or cathode catalyst layer 43 is not dried.

Further, in the embodiment, the cathode channel plate 6 is a porous body, water produced from cathode side reaction is absorbed by the plate, and absorbed water is evaporated by a fan draft. Hence, the heat release efficiency is enhanced, and the performance of the MEA 4 can be extracted to a maximum extent.

Various modified examples of the cathode channel plate 6 will be explained below.

A fuel cell 1A shown in FIG. 4 has a plurality of fins 63 attached to the outer side of a cathode channel plate 6A. The fins 63 are preferably formed of the same hydrophilic porous carbon material as that of the cathode channel plate 6A, but not limited to the same material, and different hydrophilic porous materials may be used. The porosity or average pore size may be different between the fins 63 and the cathode channel plate 6A. By adjusting the surface area, porosity or average pore size of the fins 63 and the cathode channel plate 6A, it is possible to control the water evaporation speed or water reserve amount appropriately. The fins 63 shown in FIG. 4 are parallel fins, but the invention is not limited to this shape, but may include various blade shapes, such as radial, spiral, meandering, and a pin shape.

In a fuel cell 1B shown in FIG. 5, the porous membrane 7 is provided in the clearance 60 at the channel end of the cathode channel plate 6A, and thus, a forced air flow in the cathode channel 62 may be suppressed from being formed. Since in this modified example, the clearance 60 is blocked by the porous membrane 7, the cathode channel 62 is a substantially closed space, and the wind to the MEA 4 is weak, so that drying of the proton conductive film or cathode diffusion catalyst layer can be prevented more effectively.

Figure 7:
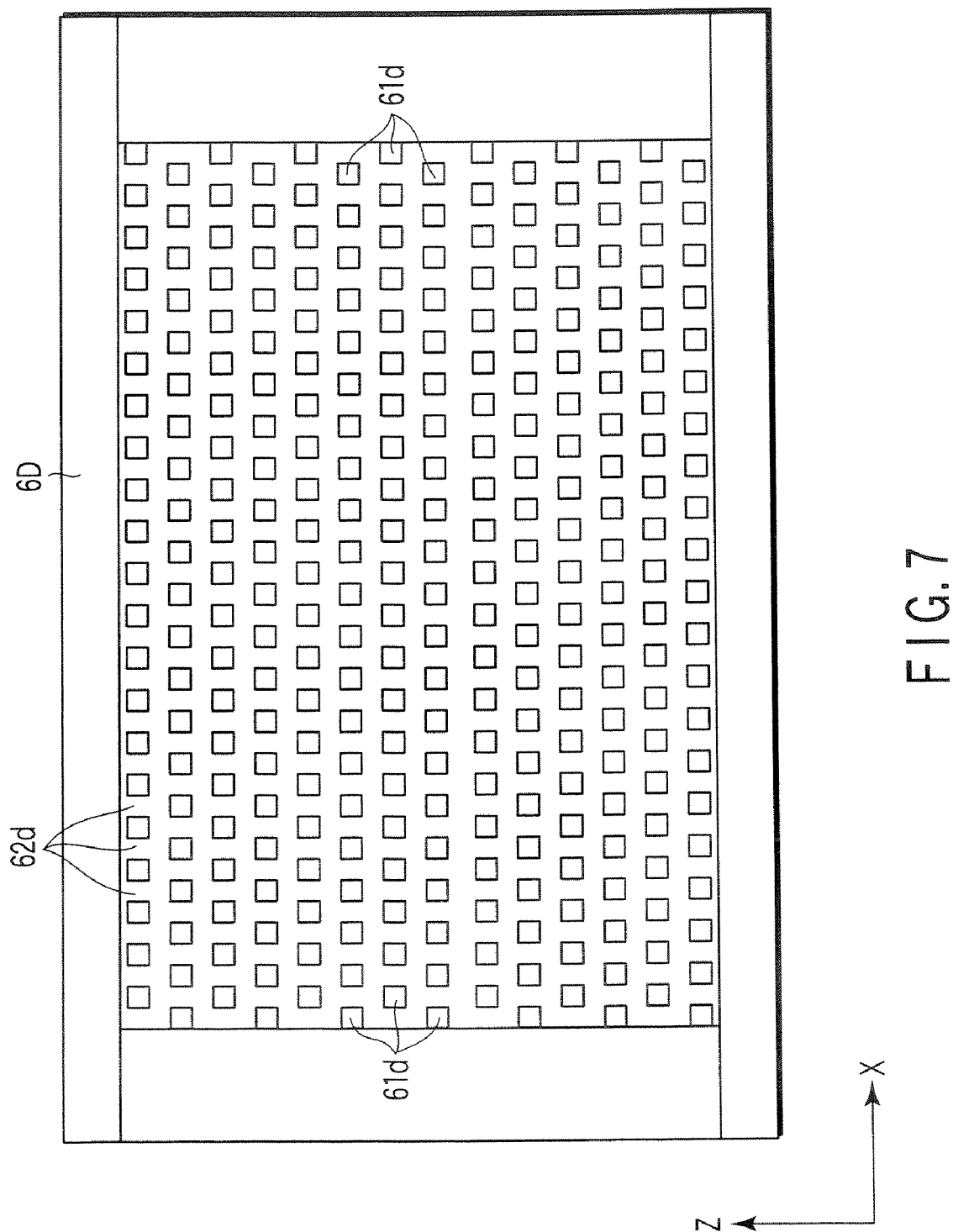
FIG. 7 is a plan view schematically showing a cathode channel plate according to a modified embodiment.

In a fuel cell 1C shown in FIG. 6, the manifold 82 and an opening degree control valve 81 are provided in the clearance 60 at the channel end face of the cathode channel plate 6A, whereby a forced flow is suppressed from being formed in the cathode channel 62. In this modified example, the controller 18 adjusts the opening degree of the valve 81, and consequently, a desired flow rate of air can be supplied into the cathode channel 62. The cathode channel 62 may be formed parallel in Z-direction as in this example, but a cathode channel 62d may be formed to have an arbitrary shape with multiple protrusions 61d as shown in a cathode channel plate 6D shown in FIG. 7. At this time, the opening communicating with the cathode channel 62d and the opening 60 is provided at a side different from the side facing the fan 16 of the cathode channel plate 6.

Figure 8:
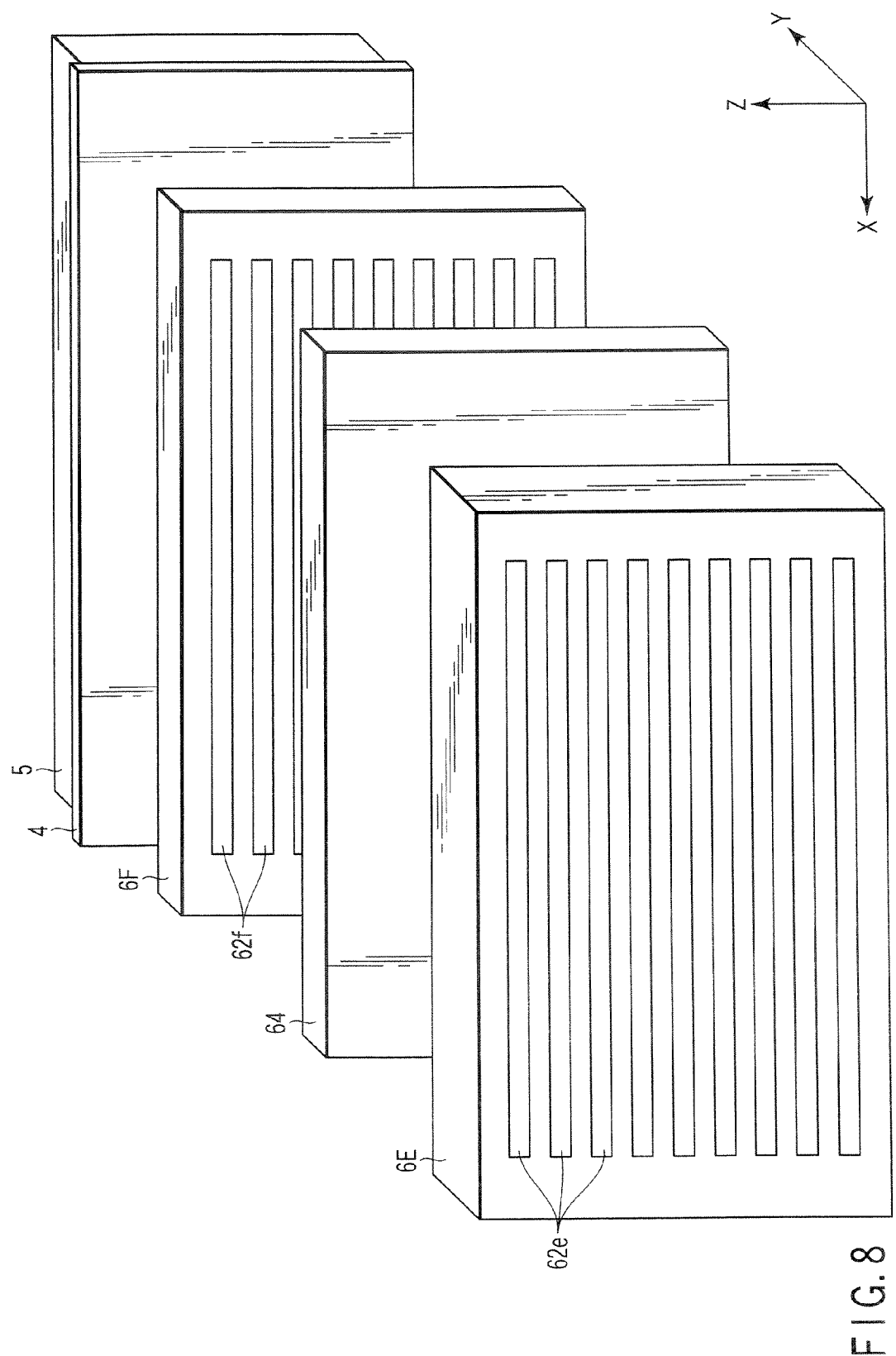
FIG. 8 is an exploded perspective view schematically showing a fuel cell according to another embodiment.

In a fuel cell shown in FIG. 8, three porous plates 6E, 64 and 6F are combined to form a cathode channel plate. In other words, the intact porous plate 64 is interposed between the porous plate 6F having a plurality of slit openings 62f and the porous plate 6E having a plurality of slit openings 62e, and a cathode space 62f as a stagnant space is formed. Since the cathode space 62f is surrounded by a porous wall, it is permeable with the outside, but formation of a forced flow of air is suppressed by fan draft.

As shown in FIG. 10A, while air flows into the closed cathode space 62f through the porous plate 64, the produced air is absorbed by the porous plate 6F. The water absorbed by the porous plate 6F is moved in the sequence of the porous plates 6F, 64 and 6E to the opposite side of the MEA 4 and reaches the surface of the porous plate 6E, and then the water is brought into contact with the fan draft air to be evaporated. In this manner, the water produced at the cathode side is evaporated indirectly through the porous plate 6E, and thus, excessive evaporation of water from the proton conductive film 41 and the cathode gas diffusion catalyst layer 43 can be suppressed. As a result, the proton conductive film 41 and the cathode gas diffusion catalyst layer 43 are not dried extremely, but contain appropriate amount of moisture. In the cathode space 62e, only the oxygen in the air is consumed, and nitrogen is not consumed. Therefore, the partial pressure of nitrogen is elevated, and the nitrogen is diffused and moved to the supply air side.

Figure 9:
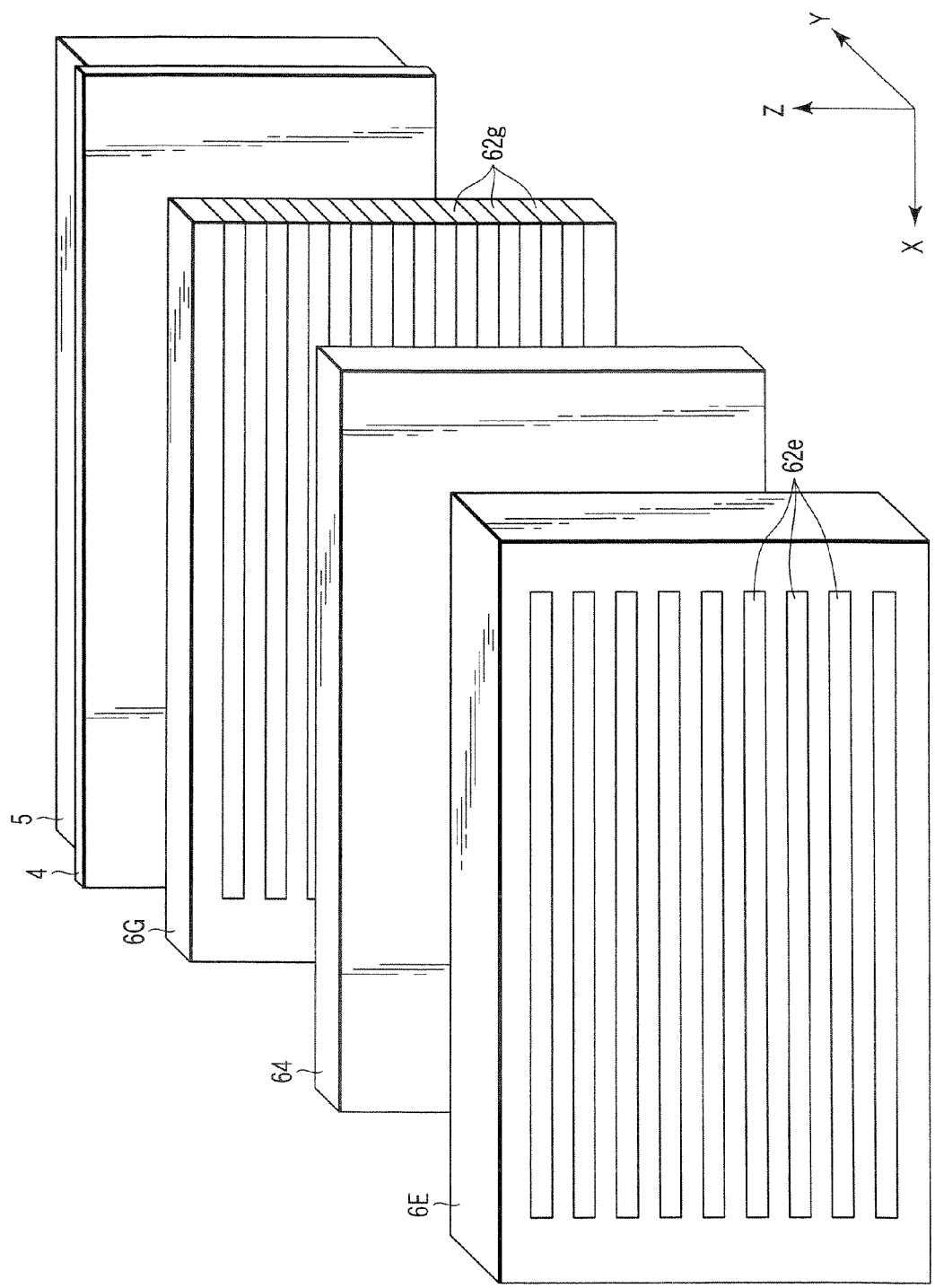
FIG. 9 is an exploded perspective view schematically showing a fuel cell according to another embodiment.

In a fuel cell shown in FIG. 9, three porous plates 6E, 64 and 6F are combined to form a cathode channel plate. In other words, the intact porous plate 64 is interposed between the porous plate 6E having a slit opening 62e and the porous plate 6G having a combtooth opening 62g, and a cathode space 62g having one end opened is formed. One end of the cathode space 62g is opened at the side face of the porous plate 6F. The opening communicating with the cathode space 62g and the opening 60 is provided at a side different from the side facing the fan 16 of the porous plate 6G. The cathode space (62g) having one end closed is surrounded by the porous wall and is thus permeable with the outside, but formation of a forced flow of air is suppressed by the fan draft.

As shown in FIG. 10A, while air flows into the closed cathode space 62g through the porous plate 64, the produced water is absorbed by the porous plate 6G. The water absorbed by the porous plate 6G is moved in the sequence of the porous plates 6G, 64 and 6E to the opposite side of the MEA 4 and reaches the surface of the porous plate 6E, and then, the water is brought into contact with the fan draft air to be evaporated. In this manner, the water produced at the cathode side is evaporated indirectly through the porous plate, and thus, excessive evaporation of water from the proton conductive film 41 and the cathode gas diffusion catalyst layer 43 can be suppressed. As a result, the proton conductive film 41 and the cathode gas diffusion catalyst layer 43 are not dried extremely, but contain a proper amount of moisture. In the cathode space 62g, only the oxygen in the air is consumed, and nitrogen is hardly consumed. Therefore, the partial pressure of nitrogen is elevated, and the nitrogen is diffused and moved to the supply air side.

In a cathode channel plate 6H shown in FIG. 10B, the air channel is a hydrophobic porous body 65, and its surrounding portion is a hydrophilic porous body. Accordingly, water hardly invades into the porous body 65 serving as an air permeation channel, and smooth flow of air into the cathode channel 62g and diffusion of nitrogen are maintained. When using a hydrophilic element for the porous body 65 serving as an air permeation channel, the capillary force is stronger in the porous body of a smaller pore size. For this reason, by using a porous body of a larger pore size than in the other portion, clogging of the channel by a liquid can be prevented. By setting the pore size of the porous body larger at the MEA side and smaller at the opposite side, motion of the liquid by capillary force can be promoted. The cathode channel plate 6H may be formed of a metal having fine wicks for moving, for example, the liquid to the side opposite to the MEA 4 by the capillary force formed on the surface thereof.

In a cathode channel plate 6I shown in FIG. 10C, an adsorbent 66 such as active carbon for absorbing traces of hydrocarbon gas in the air is provided in a cathode space 62i, whereby traces of hydrocarbon gas can be absorbed solely from the air necessary for cathode reaction, and the amount of the adsorbent 66 can be minimized.

In a cathode channel plate 6J shown in FIG. 10D, a micro pore 67 is opened to communicate with the cathode space 62i and opening 60 in order to supply air into the closed cathode space 62i. In this case as well, the pore 67 is opened in a face different from the side facing the fan 16 of the cathode channel plate 6I (preferably in a direction substantially orthogonal to the supply air flow direction), and consequently, a stagnant state is maintained in the cathode space 62i.

It is required to release the heat equivalent to the result of subtracting the water evaporation latent heat from the heat generated by power generation by air cooling. For this reason, it is required to supply the air flow rate f shown in the above formula (1) for release of heat.

The controller 18 always monitors the temperature of the MEA 4 so as to control the supply air flow f such that the temperature of the MEA 4 is constant.

According to the embodiment, the cathode catalyst layer and proton conductive polymer film can be prevented from being dried, and worsening of the power generation characteristic of the MEA can be prevented. In the fuel cell of the embodiment, air does not flow into the cathode channel plate even if an air flow necessary for removing the heat generated from the MEA is supplied. Consequently, necessary heat is released, and worsening of the characteristic of the MEA can be avoided by preventing drying of the cathode catalyst layer and proton conductive polymer film.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell comprising:
a container including at least two openings;
a power generating unit contained in the container, the power generating unit including a membrane electrode assembly, an anode channel plate and a cathode channel plate; and
a fan to supply oxygen into the membrane electrode assembly from one of the openings of the container, wherein the cathode channel plate has a clearance against the container, and
the openings of the container communicate, via the clearance, with a space disposed between the cathode channel plate and the membrane electrode assembly, the space being adjacent to a face of the membrane electrode assembly different from a face of the membrane electrode assembly opposing the fan.

2. The fuel cell according to claim 1, further comprising a porous body provided to close at least part of the clearance.

3. The fuel cell according to claim 1, further comprising:
a manifold provided in the clearance; and
an on-off valve provided at a terminal end of the manifold, the on-off valve adjusting a flow rate of air to be supplied in the membrane electrode assembly.

4. The fuel cell according to claim 2, wherein the porous body is hydrophobic.

5. The fuel cell according to claim 1, wherein the cathode channel plate is formed of porous carbon.

6. The fuel cell according to claim 1, wherein the cathode channel plate is hydrophilic.

7. A fuel cell system comprising:
a container including at least two openings;
a power generating unit contained in the container, the power generating unit including a membrane electrode assembly, an anode channel plate and a cathode channel plate;
a fan to supply oxygen into the membrane electrode assembly from one of the openings of the container;
a fuel cartridge which stores a fuel;
fuel supply means for supplying the fuel to the power generating unit from the fuel cartridge; and
a circulation line which circulates the fuel in the power generating unit, wherein
the cathode channel plate has a clearance against the container, and
the openings of the container communicate, via the clearance, with a space disposed between the cathode channel plate and the membrane electrode assembly, the space being adjacent to a face of the membrane electrode assembly different from a face of the membrane electrode assembly opposing the fan.

8. The fuel cell according to claim 1, wherein the space disposed between the cathode channel plate and the membrane electrode assembly is divided by a plurality of channel walls in the cathode channel plate.

9. The fuel cell according to claim 8, wherein the channel walls in the cathode plate extend in a direction perpendicular to a direction of flow directly discharged from the fan.

10. The fuel cell according to claim 8, wherein the channel walls in the cathode channel plate extend in a direction normal to the face of the membrane electrode assembly different from a face of the membrane electrode assembly opposing the fan.

11. The fuel cell according to claim 1, wherein a plurality of fins are attached to an outer side of the cathode channel plate.

12. The fuel cell according to claim 1, wherein a first, second, and third porous plate form the cathode channel plate, wherein
the first and third porous plate include a plurality of slit openings, and
the second porous plate is free of openings, and
the second porous plate is sandwiched between the first and third porous plate.

13. The fuel cell according to claim 1, wherein the clearance is adjacent to a plurality of faces of the cathode channel plate.

14. The fuel cell according to claim 13, wherein the clearance extends along an entire face of the cathode channel plate.

* * * * *